(12) United States Patent
Wollersheim et al.

(10) Patent No.: US 7,860,488 B2
(45) Date of Patent: Dec. 28, 2010

(54) DEVICE DETECTION IN MOBILE NETWORKS

(75) Inventors: Maurice Wollersheim, Maastricht (NL); Klaas Wijbrans, Rijen (NL)

(73) Assignee: Markport Limited, Dublin (IE)

( * ) Notice: Subject to any disclaimer, the term of this patent is extended or adjusted under 35 U.S.C. 154(b) by 873 days.

(21) Appl. No.: 11/808,181

(22) Filed: Jun. 7, 2007

(65) Prior Publication Data

US 2007/0287433 A1 Dec. 13, 2007

Related U.S. Application Data

(60) Provisional application No. 60/811,792, filed on Jun. 8, 2006.

(51) Int. Cl.
*H04Q 7/38* (2006.01)

(52) U.S. Cl. ............... 455/414.1; 455/411; 455/412.1; 455/422.1; 455/403; 455/445; 709/223; 709/218

(58) Field of Classification Search ............ 455/414.1, 455/411, 412.1, 422.1, 403, 445
See application file for complete search history.

(56) References Cited

U.S. PATENT DOCUMENTS

| | | | |
|---|---|---|---|
| 5,854,982 A * | 12/1998 | Chambers et al. | 455/445 |
| 6,275,692 B1 | 8/2001 | Skog | 455/414 |
| 7,512,398 B2 * | 3/2009 | Chambers et al. | 455/411 |
| 2002/0013825 A1 * | 1/2002 | Freivald et al. | 709/218 |
| 2004/0064537 A1 * | 4/2004 | Anderson et al. | 709/223 |
| 2006/0009214 A1 | 1/2006 | Cardina et al. | 455/432 |

FOREIGN PATENT DOCUMENTS

| | | |
|---|---|---|
| EP | 1331833 A1 | 7/2003 |
| WO | WO 01/31840 | 5/2001 |
| WO | WO 2004/004390 | 1/2004 |
| WO | 2005/015935 | 2/2005 |
| WO | WO 2005/036916 | 4/2005 |

OTHER PUBLICATIONS

Arthur Fuller, "Intelligent Database Design Using Hash Keys" Feb. 17, 2006, pp. 1-2, XP002452853.

* cited by examiner

*Primary Examiner*—Nick Corsaro
*Assistant Examiner*—Michael T Vu
(74) *Attorney, Agent, or Firm*—Jacobson Holman PLLC

(57) ABSTRACT

An application (1, 10, 20) in a mobile network, receives an EIR trigger (MAP CHECK_IMEI). The application generates a signature derived from a device identifier (IMEI) and a subscriber identifier (e.g. IMSI), the signature not having a semantic meaning as it is pseudo-randomly generated. The application (1, 10, 20) checks if the signature exists in a signature store (2, 11, 21); and if not, determines that the device/subscriber combination has not been detected in the network within a certain preceding time window, and stores the signature in the store, with an associated timestamp. It also transmits a notification to an external system such as a device management system. If the signature is already in the database, the application determines that the device/subscriber combination already exists in the network and updates a time stamp associated with the signature in the store to indicate the last time the signature was processed.

23 Claims, 1 Drawing Sheet

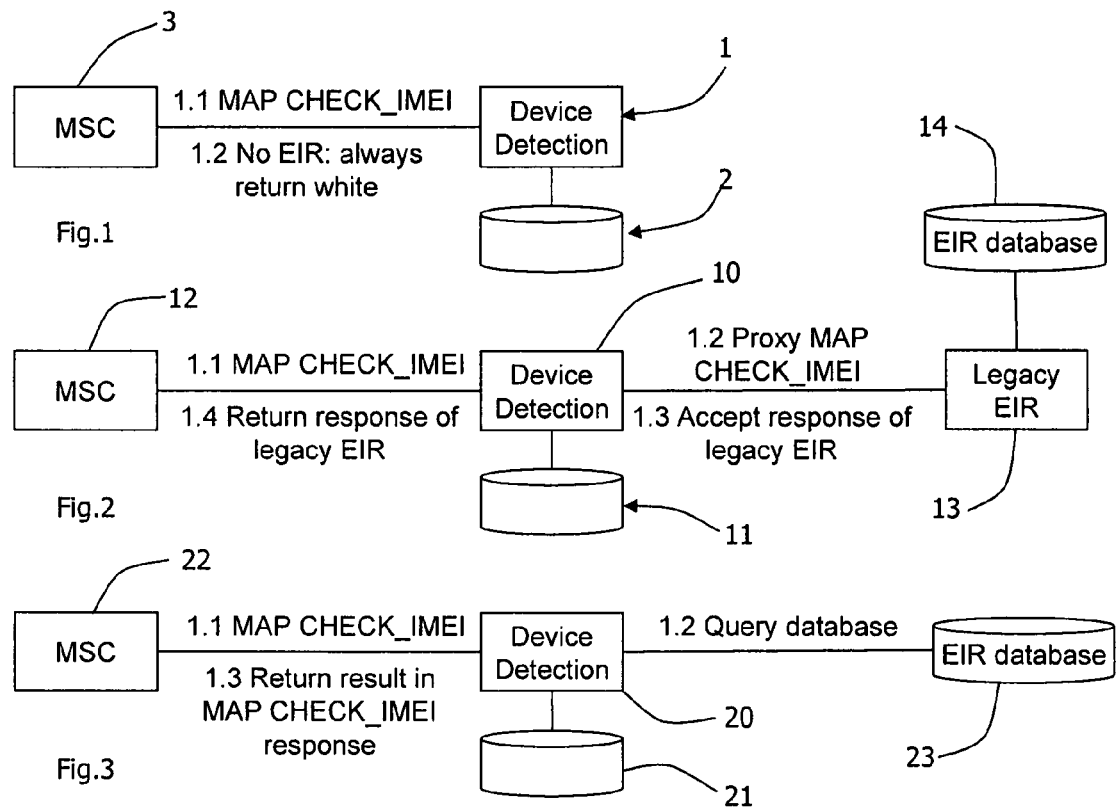
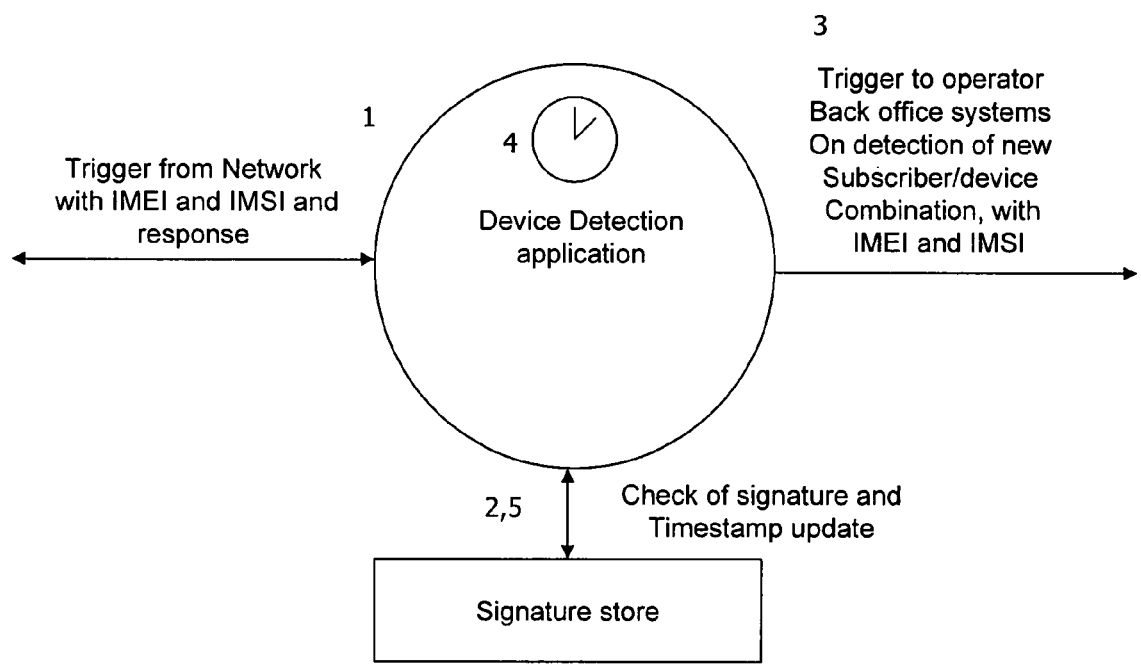

DEVICE DETECTION IN MOBILE NETWORKS

This is a complete application of U.S. Provisional Patent Application Ser. No. 60/811,792 filed 8 Jun. 2006.

FIELD OF THE INVENTION

The invention relates to detection of devices being used by subscribers of mobile operators.

PRIOR ART DISCUSSION

The following are definitions of some terms used in this specification.

Device Identity: term used for the unique identity of a specific device. In general, within GSM/UMTS network it is the IMEI of a device.

EIR (Equipment Identity Register) keeps a list of mobile device identifiers which are to be banned from the network or monitored (originally intended for the tracking of stolen phones). Upon attaching to the network or at call setup time (dependent on the vendor of the network switching system), the switch will contact the EIR to check whether that specific device is allowed to be present on the network. The EIR exchanges the lists of (stolen) phones with a central EIR so that stolen devices cannot be used on any of the connected networks.

IMEI. International Mobile Station Equipment Identity. An identification number assigned to GSM mobile stations that uniquely identifies each one. The IMEI (14 digits plus check digit) or IMEISV (16 digits) includes information on the origin, model, and serial number of the device, with the International Mobile Station Equipment Identity and Software Version Number (IMEISV) also including an element identifying the software version number of the mobile equipment.

IMSI. International Mobile Subscriber Identity—A number uniquely identifying a GSM subscriber. The number contains two parts: the first identifies the GSM network operator with whom the subscriber has an account. The second part of the number is allocated by the network operator to identify uniquely the subscriber. IMSI=MCC+MNC+MSIN, in which MCC means Mobile Country Code, MNC means Mobile Network Code, MSIN means Mobile Subscriber Identification Number.

Device Type. Term used for a set of devices with identical capabilities.

MDN. Mobile Directory Number. A 10-digit directory number used to call a wireless phone.

MEID. (Mobile Equipment Identifier), a non-GSM alternative to the IMEI.

MIN. Mobile Identification Number (MIN)—Uniquely identifies a mobile unit within a wireless carrier's network.

Subscriber Identity: term used for the identity of a specific subscriber. In general, the MSISDN is used. Sometimes, the SIM identity (IMSI) is used.

WO2004/004390 A1 describes the detection of device changes using probing of signalling links to the MSC or the HLR and the use of an MSISDN/IMEI mapping to determine the device properties.

WO2005/036916 A1 describes SIM based detection of device changes using SMS to indicate the device change to the device detection application.

U.S. Pat. No. 6,275,692 B1 describes the adaptation of service to a specific device using information obtained from the network.

US2006/0009214 A1 describes the use of the IMEI/SIM identification together with a database to notify service providers of device changes.

EP1331833 A1 describes network based device change detection by detecting circulating MSISDN-IMEI pairs in the mobile telephone network and storing them in a database that can be consulted.

WO01/31840 describes identification of a user using storage of a user identifier, a device identifier and a time stamp. Searches are keyed on one of the identifiers.

The current technology for device detection is based on the use of conventional database paradigms under the assumption that the device identity and the subscriber identity are unique identifications that together constitute a unique identification of a device+subscriber instance. Based on that paradigm, these systems request storage of the device identity and the subscriber or SIM identity as a 2-tuple (i.e. an ordered pair) in a database. This does not take into account that:

A single subscriber may have multiple phones concurrently, each with the same subscriber identification (cloned SIM), or swapping the SIM between these phones.

Many phones may seem to be using the same device identity. This is especially the case, because for major brands the value of the IMEI is programmable when the phone is flashed, with many phones originally provided with a SIM lock later being re-flashed with the same IMEI or part thereof to remove the SIM lock.

As a result, storage of the actual device and subscriber identity in a database as a 2-tuple is highly inefficient in most databases due to the n:m relationship and the high re-use of the same key value. This prohibits efficient detection of device changes. As device detection based on network registration of a device, may generate hundreds if not thousands of requests per second, efficiency in the database is very important for avoiding onerous hardware requirements.

Databases linking the identity of a subscriber with the identity of a device already exist. An example of such a database is the HLR itself, which is able to store the IMEI of a handset together with the MSISDN and the IMSI of a subscriber. The HLR implementation has the disadvantage that the information is only disclosed at the MAP level by interrogating the HLR with the appropriate MAP requests.

Traditionally, device detection is based on the use of databases that store both the identity of a device and the identity of either a subscriber (e.g., MSISDN or IMSI) or SIM card (e.g., IMSI if different IMSIs are used for multiple devices of the same subscriber). These databases either store only the last handset a specific subscriber has used based on the MSISDN or IMSI of a subscriber, or maintain a set of relations between all handsets ever used by that subscriber by storing MSISDN/IMSI and IMEI tuples.

A database only storing the last used device is not able to distinguish between a new subscriber/device combination and an already seen subscriber/device combination. A database storing the relationship between subscribers and devices must maintain a dynamic set of relationships, as multi-card users (users who use multiple devices each with cloned SIM cards) and users who regularly swap out their SIM cards to different devices, leads to multiple relationships between the subscriber and device identity. Furthermore, due to IMEI copying, if for example the SIM lock is removed, the database will suffer from inefficient indexing as there will be a large number of devices with exactly the same IMEI. Storing the subscriber and device identity in this way is not an efficient way for detecting subscriber and device combination changes, and thus detecting when a device is new for that subscriber and thus should be provisioned by the device management system.

The invention is therefore directed towards providing an improved method and system for device detection.

SUMMARY OF THE INVENTION

According to the invention, there is provided a method performed in a mobile network, the method comprising the steps performed by one or more network elements of:
  detecting a signal from a network element indicating that a subscriber wishes to become active on the network using a mobile device;
  generating a signature derived from a device identifier and a subscriber identifier, the signature not having a semantic meaning;
  checking if the signature is in a signature store; and
    if not, determining that the device/subscriber combination does not exist in the network, and storing the signature in the database;
    if so, determining that the device/subscriber combination already exists in the network;
    transmitting a notification of device/subscriber status to an external system.

In one embodiment, the signature is generated by a hash algorithm using as inputs the device and subscriber identifiers such as an IMEI and an IMSI.

In one embodiment, the signature is a binary number.

In one embodiment, the method is implemented in response to an EIR trigger.

In one embodiment, a time stamp is stored in the signature store to indicate the time of writing the signature to the store.

In one embodiment, the method comprises the further step of, if the signature is already stored, updating the time stamp associated with the signature in the store to indicate the last time the signature was processed.

In one embodiment, the time stamps are used to determine age.

In another embodiment, the method comprises the further steps of archiving or deleting signatures having an age greater than a threshold.

In one embodiment, the signature is stored in the store at a location indicative of age.

In one embodiment, the notification includes the device identifier and the subscriber identifier.

In one embodiment, the notification includes the time stamp.

In one embodiment, the notification includes both the updated time stamp and the previous time stamp, where the time stamp is updated.

In another embodiment, the signature is generated by a detection application executing on a network element.

In one embodiment, the detection application operates as a proxy to an existing network EIR.

In one embodiment, the application generates automatically a dummy EIR positive response in addition to performing the signature-processing operations.

In one embodiment, the detection application operates together with an EIR database to replace a legacy EIR.

In one embodiment, the detection application constructs a MAP CHECK_IMEI response from the status returned from the EIR database In one embodiment, a notification is generated only when it is determined that the device/subscriber combination does not exist in the network.

In a further embodiment, the method comprises the further step of storing the signature and the subscriber identifier in a second database.

In one embodiment, the second database update is made with a key-value pair in which the subscriber identifier is the key and the signature is the value.

In one embodiment, the system generates a notification indicating the current subscriber device upon updating the second database.

In another aspect, the invention provides a mobile network device detection system comprising means for performing any method as defined above.

In a further aspect, the invention provides computer readable medium comprising software code for performing any method as defined above when executing on a digital processor.

DETAILED DESCRIPTION OF THE INVENTION

Detailed Description Of The Invention

The invention will be more clearly understood from the following description of some embodiments thereof, given by way of example only with reference to the accompanying drawings in which:

FIGS. 1 to 3 are diagrams showing operation of device detection systems of the invention;

FIG. 4 is a flow diagram for a device detection method.

DESCRIPTION OF THE EMBODIMENTS

Referring to FIG. 1 a device detection system comprises a device detection application 1 and a signature store 2. The system is shown communicating with an MSC 3.

FIG. 2 shows a device detection system having an application 10, and a signature store 11. The application 10 communicates with a legacy EIR 13 linked with an EIR database 14, and with an MSC 12.

FIG. 3 shows a device detection system comprising an application 20 and a signature store 21. The application is shown communicating with an MSC 22 and with an EIR database 23.

The device detection systems generate a signature based on a combination of subscriber and device identities. The signature has no semantic meaning, i.e. the individual identifiers which give rise to it are not directly readable in it. Each signature is time stamped, and the signature is stored in a data store together with the associated time stamp. The following is an example:

Example IMEI/IMEISV Number 35-19300-123456-1-28

Example IMSI Number 310-150-123456789

The signature is created by using a MD5 hashing algorithm that uses the concatenated IMEI and IMSI numbers as input variables.

| |
|---|
| Step 1. concatenate <IMEI> plus <IMSI>: "35193001234561283101501234567890" |
| Step 2. calculate MD5 hash signature: "e1765e21365b1a05e09062d133859565" |

This signature has no semantic meaning, i.e. the individual identifiers (IMEI or IMSI) cannot be reconstructed from the signature. In this embodiment, a one-way algorithm generates the signature. In another embodiment, the algorithm which generates the signature from the identities may be reversible, however the elements of the original identifiers are still not directly discernable in the signature. It is only by doing the reverse procedure that the original element can be recovered. Because of the pseudo random nature of the generated signature (which does not have semantic meaning) a unique key is generated, ensuring that searching is very efficient. The signature store has a simple and efficient structure, addressed by a key-value pair in which the key is the signature and the time stamp is the value.

The signature is used to determine if a device/subscriber combination exists in the network, and a notification of device/subscriber status is transmitted to an external system. The latter may for example be a device management system, a customer care database, an automatic provisioning system for a network element such as an MMSC, a WAP provisioning system a logging system, or an address book provisioning system.

The following sets out the illustrated scenarios for implementation of the invention.

FIG. 1 Embodiment

For networks not providing EIR functionality, the device detection system 1, 2 is integrated directly into the network in lieu of an EIR. The MSC 3 is configured to see the device detection application 1 as an EIR. The application 1 responds with a default positive acknowledgement ("return white", indicating that the device is allowed on the network) as EIR functionality is not available. In addition, the application 1 generates a signature from the device and subscriber identifiers included in the MAP CHECK_IMEI request transmitted from the MSC 3. It uses the signature to check (by efficiently checking if the signature is in the store 2) if this device/subscriber combination exists in the network, i.e. has been previously detected on the network. In this embodiment, the check is to determine if the combination was detected in a previous time window. The time window is in this embodiment configurable. In an alternative embodiment, the check determines if the combination was ever detected in the network, and not just in a time window. The application I generates a notification for an external system to indicate the outcome of this check.

FIG. 2 Embodiment

For networks with an existing legacy EIR, the device detection application 10 is integrated in the signalling path of the EIR. Requests for an EIR check are passed to the EIR 13 by proxying. The response of the EIR 13 is accepted and returned to the MSC 12 as the answer to the original MAP CHECK_IMEI request. A device/subscriber combination check is carried out as described above.

FIG. 3 Embodiment

For networks requiring EIR functionality, the system of the invention is extended with the capability to query the EIR database 23 containing EIR specific information (in practice a list of IMEIs with their associated status). The system 20, 21 determines the EIR response to be returned, based on the response returned from the EIR database 23, and passes the response to the MSC 22. Again, a similar check is made for the device/subscriber combination. The detection application constructs a MAP CHECK_IMEI response from the status returned from the EIR database 23.

The following are the primary steps implemented by the device detection systems, with reference to FIG. 4.

1. MSC sends a MAP CHECK_IMEI operation containing IMEI and IMSI. The signal 1 incorporates the EIR response, either a dummy response (FIG. 1) or a real response (FIGS. 2 and 3). The response in this embodiment is generated in parallel with performance of the operations below.
2. The device detection application checks whether a signature exists in the store, and if the signature exists, updates the associated timestamp with the current time. If the signature does not exist then the new signature is written to the store, with an associated timestamp set to the current time.
3. If the generated signature was not in the database, this indicates that it is a new device/subscriber combination and the device detection application sends out a trigger containing the IMEI and IMSI of the original request.
4. Triggered by time, the device detection application activates ageing of signatures. To prevent the presence of stale signatures in the store, this clean-up facility ages all entries with an age older than a configurable period and removes those entries.
5. If signature is stale, it is removed from the database.

The detection application is particularly suitable for detection of new subscriber/device combinations as it uses a simple and efficient database which allows very fast reads in real time. The database structure arises because of the fact that the signatures have no semantic meaning and so are not indexed using the identifiers. It should be noted that device detection steps 2-5 are performed independently of the EIR response. This is advantageous where for example a device is stolen, the device detection application providing a real time check if a stolen device has been used.

When an EIR trigger arrives at the detection application, it calculates the signature of the handset from the IMSI and IMEI in the EIR trigger and compares these to stored signatures. If the signature is found the detection application has detected that the subscriber has changed to an already known subscriber/device combination, and a time stamp is updated indicating the last time this signature was seen. If the signature is not found (this indicates that a new subscriber/device combination has been detected), the signature is added to the store by the device detection application and an action is undertaken to send out a trigger containing the detected IMEI/IMSI pair. As a result, each time a new combination of an IMEI and an IMSI is detected, a new signature is added to the signature store. The output notification is particularly useful as a trigger for provisioning of a new device.

In another embodiment the system has a second database, mainly to detect a change in the last used handset of a subscriber. The second database contains subscriber identifier to signature mappings such as IMSI to signature mappings or MSISDN to signature mappings. The second database is addressed using a key-value pair, in which the subscriber identifier is the key and the signature is the value. Such a database is separate from the signature store and so does not affect the core signature checking operations described above.

After calculating the signature, as a second step the device detection application queries the second database to lookup (and update) the last seen signature that belongs to the subscriber. If the signature has changed, it is known that a change in the active device of a subscriber has been detected and a device change trigger is sent out. This is useful for management of service delivery. For example, if the user regularly switches between two different devices, the signature store will not detect a user/device combination change within a pre-configured time window. However, the second database will keep track of what device the user is currently using.

In summary, the basic database interactions are:
1) Application receives EIR trigger from MSC and calculates a signature derived from the subscriber and device identities.
2) The application uses the signature store to detect new subscriber device combinations as described above.
3) The application queries the second database with the subscriber identifier (IMSI, MSISDN) and compares the signature present with the calculated signature to detect changed subscriber/device combinations, overwriting the previous signature with the latest signature when a device change has occurred.

The description above describes the invention in terms of the GSM device and subscriber identifications and in terms of database technology as a preferred embodiment. The invention is however not limited to GSM technology (for example, the use of MEID and MIN/MDN in CDMA networks are alternatives) or to a database implementation (for example, in-memory implementation using data structures are alternatives).

It will be appreciated that the system of the invention detects new subscriber and device combinations by monitoring and keeping track of unique subscriber and device identity combinations using a simple, flattened database with a single key. Through simple logic (i.e., does this signature exist in the database) it is then determined that a new device is detected for that subscriber resulting in a trigger to the device management system or any other system for which this information is relevant (e.g. to provision that device, log that event etc.). If the signature already exists, the invention knows that the device combination was seen before and thus will not generate a provisioning trigger.

By focusing on the detection of new subscriber/handset combinations, and by only storing the signature the invention does not suffer from the problems of a relational database, a directory server or dynamic data structures. This signature is a number (e.g. binary or hexadecimal) constructed from the SIM identity (IMSI) and the IMEI as provided by the network in an EIR trigger using an appropriate mathematical function. As the signature has no semantic meaning, being pseudo-random in nature, its implementation in the database is highly efficient. The use of such a signature not only will simplify the backend database, but also allows for efficient in-memory implementations resulting in significant performance improvements.

The invention is not limited to the embodiments described but may be varied in construction and detail.

The invention claimed is:

1. A method performed by a mobile network, the method comprising the steps performed by one or more network elements of a receiving device and subscriber identifiers:

detecting a signal from a network element indicating that a subscriber wishes to become active on the network using a mobile device;

generating a non-semantic signature from said device identifier and a subscriber identifier;

checking if the signature is in a signature store; and if not, determining that the device/subscriber combination does not exist in the network, and storing the signature in the database;

if so, determining that the device/subscriber combination already exists in the network;

transmitting a notification of device/subscriber status to an external system.

2. The method as claimed in claim 1, wherein the signature is generated by a hash algorithm using as inputs the device and subscriber identifiers.

3. The method as claimed in claim 2, wherein the signature is a binary number.

4. The method as claimed in claim 1, wherein the method is implemented in response to an EIR trigger.

5. The method as claimed in claim 1, wherein a time stamp is stored in the signature store to indicate the time of writing the signature to the store.

6. The method as claimed in claim 5, comprising the further step of, if the signature is already stored, updating the time stamp associated with the signature in the store to indicate the last time the signature was processed.

7. The method as claimed in claim 5, wherein the time stamps are used to determine age.

8. The method as claimed in claim 5, wherein the notification includes the time stamp.

9. The method as claimed in claim 1, comprising the further steps of archiving or deleting signatures having an age greater than a threshold.

10. The method as claimed in claim 9, wherein the signature is stored in the store at a location indicative of age.

11. The method as claimed in claim 1, wherein the notification includes the device identifier and the subscriber identifier.

12. The method as claimed in claim 11, wherein a time stamp is stored in the signature store to indicate the time of writing the signature to the store, and the notification includes both an updated time stamp and a previous time stamp, where the time stamp is updated.

13. The method as claimed in claim 1, wherein the signature is generated by a detection application executing on a network element.

14. The method as claimed in claim 13, wherein the detection application operates as a proxy to an existing network EIR.

15. The method as claimed in claim 13, wherein the detection application operates as a proxy to an existing network EIR; and wherein the application generates automatically a dummy EIR positive response in addition to performing the signature-processing operations.

16. The method as claimed in claim 13, wherein the detection application operates together with an EIR database to replace a legacy EIR.

17. The method as claimed in claim 16, wherein the detection application constructs a MAP CHECK_IMEI response from the status returned from the EIR database.

18. The method as claimed in claim 1, wherein a notification is generated only when it is determined that the device/subscriber combination does not exist in the network.

19. The method as claimed in claim 1, comprising the further step of storing the signature and the subscriber identifier in a second database.

20. The method as claimed in claim 19, wherein the second database update is made with a key-value pair in which the subscriber identifier is the key and the signature is the value.

21. The method as claimed in claim 19, wherein the system generates a notification indicating the current subscriber device upon updating the second database.

22. A mobile network device detection system comprising means for performing a method as claimed in claim 1.

23. A computer readable medium comprising software code for performing a method of claim 1 when executing on a digital processor.

* * * * *